Patented Mar. 10, 1931

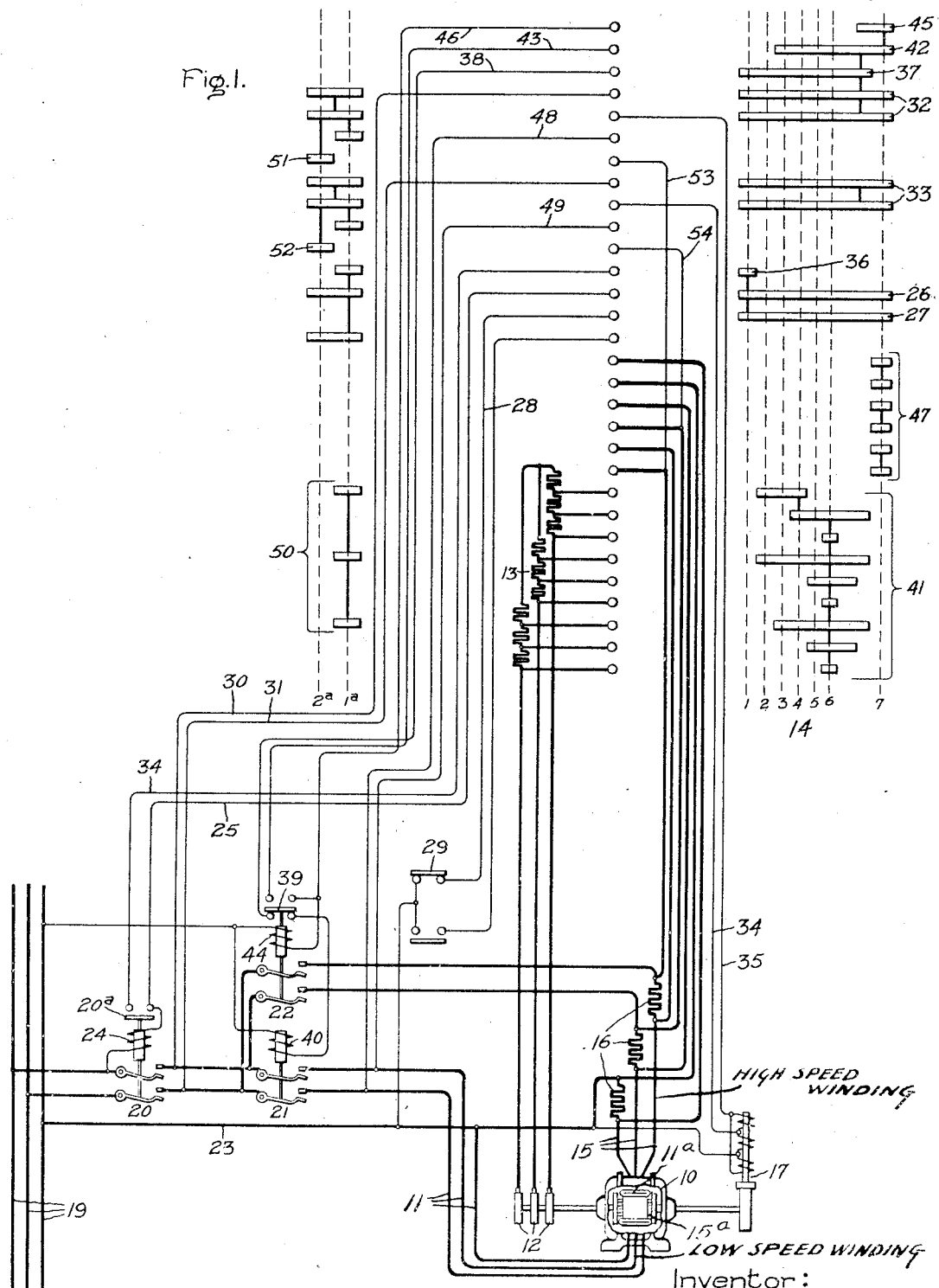

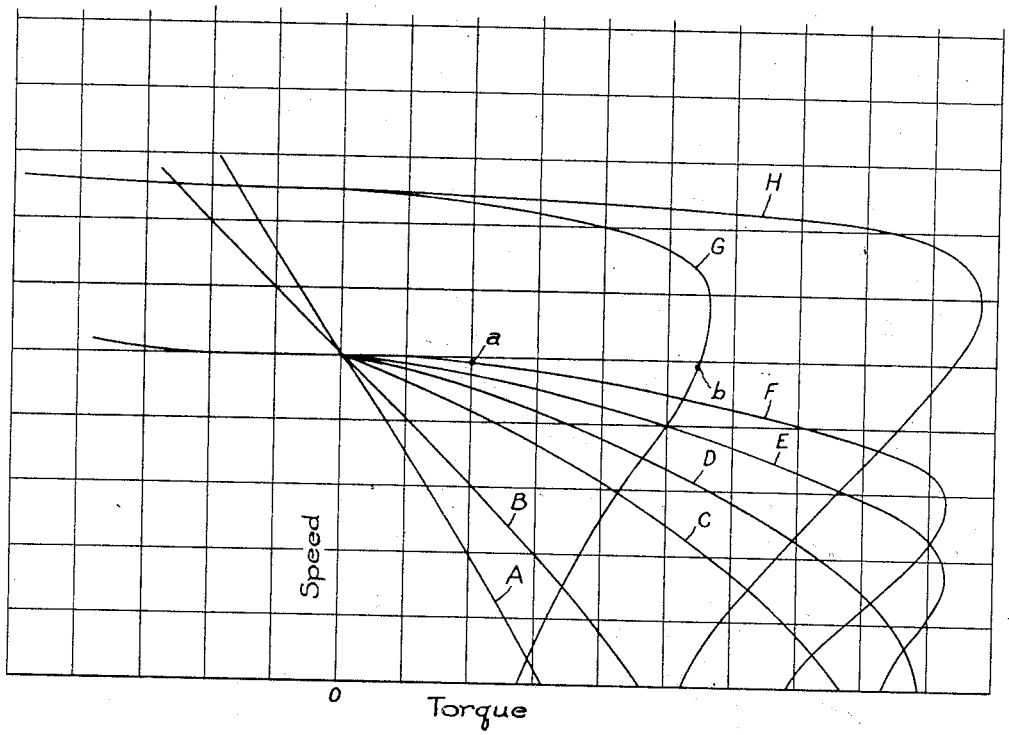

1,796,218

UNITED STATES PATENT OFFICE

CARL SCHIEBELER, OF BERLIN, GERMANY, ASSIGNOR TO GENERAL ELECTRIC COMPANY, A CORPORATION OF NEW YORK

SYSTEM OF MOTOR CONTROL

Application filed April 30, 1928, Serial No. 274,140, and in Germany May 11, 1927.

This invention relates to a system of motor control, more particularly to control systems for crane hoisting mechanism, etc., employing a plurality of electric motors or a single motor with a plurality of windings, one motor or winding giving a relatively high torque but slow speed and the other giving a relatively low torque but high speed.

In such systems for crane hoisting mechanism the motors are controlled by means of a drum controller and the slow speed main driving motor of high torque, serving to raise the heavy loads, is operated on the first lifting and lowering positions of the drum, while for raising lighter loads or the empty hook the high speed auxiliary motor of low torque is operated on the last position of the drum. In one of its aspects the invention has for its object to avoid shocks and thus produce more uniform operation in the switching of the main motor to the auxiliary motor and vice versa.

For a more complete understanding of my invention reference should be had to the accompanying drawings, Fig. 1 of which shows in diagrammatic form a system of motor control embodying the invention; while Fig. 2 shows a set of curves illustrating various features of operation.

Referring to the drawing, an embodiment of the invention is illustrated as employed in the operation of a harbor crane in which the lowering of drop loads is controlled by regenerative braking. As shown, the crane is driven by means of an electric motor 10 provided with two armature windings. One winding giving the main slow speed driving motor torque has a relatively large number of poles and is provided with terminals 11. This slow speed or main winding is also provided with a rotor winding 11a connected with slip rings 12 across which resistances 13 may be connected to control the starting and regenerative braking of the motor by means of the drum controller 14. The control of this main driving motor winding, having the terminals 11 and the resistances 13 provided for its rotor circuit, is effected over the positions 1-6 of the controller.

The second armature winding for the motor 10, provided with terminals 15, has a smaller number of poles whereby a higher speed is obtained than with the main driving winding and this winding is provided with a short-circuited rotor winding 15a giving a lower torque. The motor is operated on this auxiliary or high speed winding with the controller in the position 7, the transition from the main driving winding being effected over a relative wide step between the positions 6 and 7. During this transition period, resistances 16 are first connected in circuit with the auxiliary winding for acceleration of the motor and when the position 7 is reached these resistances are short-circuited. A three-phase magnetic brake 17 is also provided for the crane and this brake is likewise controlled by the controller.

As shown, the connection and disconnection of the motor windings and the brake with a suitable three-phase electrical supply source 19, is effected by means of electromagnetic switches 20, 21 and 22. A common connection 23 is provided from one conductor of the supply source to the windings and the brake, the connections with the other two conductors of the supply source being controlled by the switches. In the operation of the system when the controller is thrown on the position 1 the operating coil 24 of the switch 20 is energized from the supply source through a circuit leading from one conductor of the supply source through the coil, the conductor 25, segments 26 and 27 and through a conductor 28 and the switch 29 to the conductor 23. The switch 20 thereupon closes and energizes the operating coils for the brake which is thereupon released, this circuit being through the two conductors 30 and 31, the segments 32, 33 and the conductors 34, 35. At the same time a holding circuit for the coil 24 is established by the relay 20ª of the switch 20 which closes and establishes a circuit through the conductor 34 and by way of a segment 36 and segments 26 and 27 to the conductor 28. A circuit is also formed from the segments 32 and segment 37 and conductor 38 through the relay 39 of switch 22 and the operating coil 40 of switch 21 back to a supply source 19. This closes the switch 21 which energizes the main driving winding, the resistances 13, it will be observed, being included in the rotor circuit of this winding.

During the succeeding steps 2–6 inclusive of the controller the driving motor is accelerated by the gradual short-circuiting of the resistances 13 through the lower group of segments 41. On the third position, it will be observed, that the segment 42 completes a connection with a conductor 43 leading to the upper pair of contacts of the relay 39 so that when the coil 44 of the switch 22 is energized a holding circuit for the coil is immediately established through the upper pair of contacts of the relay.

In the relatively great transition step between the positions 6 and 7 it will be observed that certain of the resistances 13 are connected in the rotor circuit of the main winding by certain of the segments of the group 41 which are extended over into this transition step. As the movement of the controller is continued, a segment 45 makes connection with a conductor 46 through which a circuit is established for the coil 44 and the switch 22 is thereby closed. This connects the auxiliary winding to the supply source in circuit with the resistances 16. At the same time the circuit of the coil 40 opens through the lower contacts of the relay 39 whereby the switch 21 drops out. In position 7, the resistances 16 are short-circuited by the group of segments 47 and the motor thereupon accelerates to its full high speed on the auxiliary winding.

One of the objects in first introducing resistance in the rotor circuit of the main winding before changing the connections to the auxiliary winding is to prevent any possibility of the main winding being connected temporarily and acting as a regenerative brake while the motor is being accelerated by the auxiliary winding. With the arrangement shown, it might well be that the switch 21 would have a time interval and would not drop out to disconnect the main winding until a short interval after the energization of the auxiliary winding, and in this interval the main winding would apply regenerative braking force. The results obtained will be clear from an examination of the curves shown in Fig. 2 in which the curves A, B, C, D, E and F are typical speed torque curves for the main winding and correspond respectively to the controller points 1–6 inclusive, while the curves G and H are speed torques for the auxiliary winding, the curve G corresponding to the conditions with the resistances 16 in the circuit. With the main winding energized and all resistance cut out the motor would operate on the curve F, for example, at some point $a$. At this speed, when the auxiliary winding is connected the motor will tend to operate at some point $b$ in the curve G under the influence of this winding whereby a relatively great torque is applied, and whereby the motor speed will be increased. If now the speed is increased by the auxiliary winding with the main winding still energized with a short-circuited rotor it will be observed that the regenerative braking, due to the main building, will be suddenly applied and increased with very great rapidity. However, by the insertion of resistance in the rotor points before the auxiliary winding is connected the motor will tend to operate on the curve B in response to the main winding and as a result any dynamic braking which it may temporarily apply will be comparatively small and increase gradually.

Upon switching back from position 7, the switch 22 is retained in closed position by the holding circuit for the coil 44 which is maintained closed by the segment 42 and consequently the switch 21 cannot be closed. This holding circuit is broken however when the controller is moved to position 2 and switch 22 thereupon opens and the switch 21 is thereby closed through the holding circuit established by the lower contacts of relay 39. In this position however substantially all of the resistances 13 are in the rotor circuit of the main winding which means that a relatively small regenerative force would be applied. The motor would then be operating, for example, on the curve B.

As a result of this operation the changes from one winding to another are accompanied by comparatively small changes in torque so that uniform operation is obtained.

Special reverse positions 1ª and 2ª are provided whereby the windings are connected for reverse rotation for lowering the crane under power. In position 1ª the switch 20 is closed and the conductors 30 and 31 are connected respectively to the conductors 48 and 49 whereby the main motor winding is connected for reverse rotation with substantially all the resistances 13 short-circuited by the lower group of segments 50. In position 2ª, the conductors 30 and 31 are connected by the segments 51 and 52 to the conductors 53 and 54 respectively whereby the auxiliary winding is connected for reverse rotation with the resistances 16 in circuit.

What I claim as new and desire to secure by Letters Patent of the United States is:—

1. In a motor control system, the combination with induction driving means having slow and high speed armature windings, said slow speed winding being provided with a slip ring rotor winding, resistances for said slip ring winding, switching mechanism for establishing power connections for said armature windings, and step-by-step means for controlling said switching means to first energize said slow speed armature winding and for short-circuiting said resistances to accelerate said driving means to full speed operation on said slow speed winding, and thereafter to disconnect said low speed armature winding and connect said high speed armature winding for high speed operation, said control means being arranged to reconnect a portion of said resistances before disconnecting said low speed winding.

2. In a motor control system, the combination with driving means provided with a slow speed main armature winding and a high speed auxiliary armature winding, slip ring and short circuited rotor windings for said armature windings respectively, resistances for said slip ring winding, switching means for establishing power connections for said armature windings, a drum controller arranged to control said switching means to energize said low speed armature winding and to short circuit said resistances during its initial positions to accelerate said driving means to full speed operation on said low speed winding and thereafter to deenergize said low speed winding and connect said high speed armature winding on its final positions for high speed operation, said drum switch being arranged to reconnect a portion of said resistances prior to the connection of said high speed winding, and means for preventing the reconnection of said low speed winding when said drum switch is moved back toward off-position until said resistances have been reinserted.

3. In the operation of induction motor driving means, the method of transferring the electrical connections from a low speed winding having a slip ring rotor to a high speed winding which consists in inserting resistance in said slip ring rotor, thereafter deenergizing said slow speed winding and then energizing said high speed winding.

4. Controlling means for hoisting cranes and the like, comprising low speed asynchronous motor driving means, provided with a slip ring rotor winding, high speed asynchronous motor driving means provided with a short circuited rotor winding, and control means for said driving means arranged to initially energize said low speed driving means to start the load and accelerate it to full speed of said low speed driving means, and for thereafter deenergizing said low speed driving means and then energizing said high speed driving means for the operation of light loads at high speeds.

5. Controlling means for hoisting cranes and the like, comprising low speed asynchronous motor driving means provided with a slip ring rotor winding, high speed asynchronous motor driving means provided with a short circuited rotor winding, and control means for said motor arranged to initially energize said low speed driving means to start the load and accelerate it to full speed of said low speed driving means, and for thereafter deenergizing said low speed driving means and then energizing said high speed driving means for the operation of light loads at high speeds, and means for preventing reconnection of said low speed driving means when said control means is moved back toward starting position until said resistance has been reconnected in said slip ring rotor winding.

6. Controlling means for a hoisting crane comprising low speed asynchronous motor driving means, provided with a slip ring rotor winding, high speed asynchronous motor driving means, and step-by-step control means for said driving means arranged to initially energize said low speed driving means to start the load and accelerate it to full speed of said low speed driving means, and for thereafter deenergizing said low speed driving means and energizing said high speed driving means for the operation of light loads at high speeds, said control means including means for reconnecting resistance in said slip ring rotor winding before said low speed driving means is deenergized in the transition to the high speed driving means.

In witness whereof, I have hereunto set my hand this 17th day of April, 1928.

CARL SCHIEBELER.